United States Patent [19]
Taguchi et al.

[11] Patent Number: 5,302,989
[45] Date of Patent: Apr. 12, 1994

[54] METHOD OF PROJECTING STEREOSCOPIC IMAGE AND APPARATUS FOR PRINTING STEREOSCOPIC PHOTOGRAPH

[75] Inventors: Seiichi Taguchi; Samon Hosoya, both of Kanagawa; Shunkichi Igarashi, Tokyo, all of Japan

[73] Assignee: Fuji Photo Film Co., Ltd., Kanagawa, Japan

[21] Appl. No.: 955,061

[22] Filed: Oct. 1, 1992

[30] Foreign Application Priority Data

Oct. 4, 1991 [JP] Japan .................................. 3-257722

[51] Int. Cl.$^5$ ........................................... G03B 35/00
[52] U.S. Cl. ..................................... 354/112; 355/22; 352/58
[58] Field of Search ............... 354/101, 102, 112, 114, 354/115; 352/58, 81; 355/22, 33, 46, 66

[56] References Cited

U.S. PATENT DOCUMENTS

| | | | |
|---|---|---|---|
| 3,953,869 | 4/1976 | Lo et al. ................................ | 354/115 |
| 4,120,562 | 10/1978 | Lo et al. ............................ | 355/22 X |
| 5,192,969 | 3/1993 | Igarashi et al. ...................... | 355/22 |

FOREIGN PATENT DOCUMENTS

| | | |
|---|---|---|
| 49-607 | 1/1974 | Japan . |
| 49-25902 | 7/1974 | Japan . |
| 53-33847 | 9/1978 | Japan . |

OTHER PUBLICATIONS

English language translation of Japanese Patent Application Kokoku No. 49-607.
English language translation of Japanese Patent Application Kokoku No. 49-25902.
English language translation of Japanese Patent Application Kokoku No. 53-33847.

Primary Examiner—Richard A. Wintercorn
Assistant Examiner—Howard B. Blankenship
Attorney, Agent, or Firm—Sughrue, Mion, Zinn, Macpeak & Seas

[57] ABSTRACT

In the improved method for projection a stereoscopic image, an additional lenticular sheet that has an appropriate level difference and a different pitch of lenticular lenses than a lenticular recording material such as a lenticular light-sensitive material is either placed directly on top of said lenticular recording material or inserted above and in the vicinity of said lenticular recording material, with said additional lenticular sheet being preferably moved either in one direction or reciprocally in a direction generally perpendicular to its own generatrix. This method can be implemented with the improved apparatus for printing a stereoscopic photograph. Using the improved method and apparatus, the development of moiré can be suppressed and, at the same time, the line width of linear image elements to be recorded can be easily expanded.

6 Claims, 7 Drawing Sheets

STROKE: 30mm

NUMBER OF REVOLUTION: 60rpm

PRIOR ART

FIG. 7

PRIOR ART

FIG. 8

PRIOR ART

FIG. 9

METHOD OF PROJECTING STEREOSCOPIC IMAGE AND APPARATUS FOR PRINTING STEREOSCOPIC PHOTOGRAPH

BACKGROUND OF THE INVENTION

This invention relates to a method of projecting a stereoscopic image onto a recording material such as a lenticular light-sensitive material to enable stereoscopic vision, as well as an apparatus for printing a stereoscopic image on recording materials to attain the same object. More particularly, this invention relates to a method and an apparatus that are capable of easy projection or printing of a stereoscopic photograph that is characterized by the enlargement of the area over which stereoscopic vision can be established.

PRIOR ART

While various methods have been known that are capable of providing stereoscopic vision, stereoscopic photography using lenticular lenses (or a lenticular sheet) is worth particular mention since it is one of the methods that easily establish stereoscopic vision without using spectacles or any other auxiliary devices.

Figure 7:
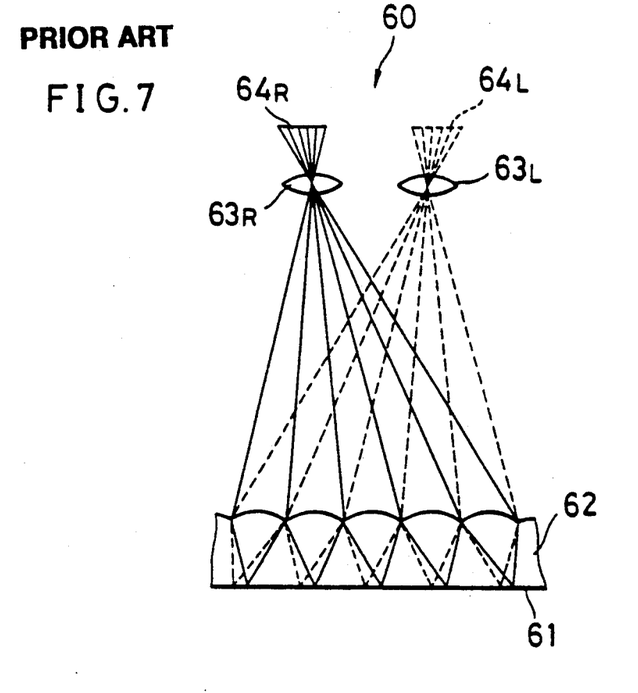
FIG. 7 is a diagram illustrating a prior art method of printing a stereoscopic photograph.
Figure 8:
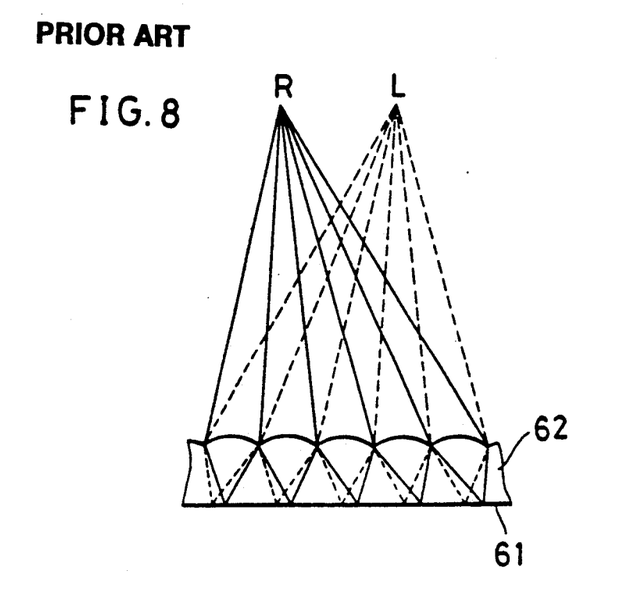
FIG. 8 is a diagram illustrating how stereoscopic vision is achieved by the viewer of a stereoscopic photograph.

A common method for providing a stereoscopic photograph using a lenticular sheet is described below with reference to the basic two-lens system. As shown in FIG. 7, a light-sensitive layer 61 is provided on the back side of a lenticular sheet 62 to form a lenticular light-sensitive material; two dimensional image information from two different view-points, namely, the right image 64R and the left image 64L, are projected onto the lenticular light-sensitive material through corresponding lenses 63R and 63L; after printing and the necessary photographic processing, the images are viewed with the right and left eyes R and L as shown in FIG. 8.

However, this method has the disadvantage that the positions of the two eyes that provide stereoscopic vision are very much limited and that if those positions are not attained, a marked drop occurs in the optical „density (hereinafter referred to simply as "density"), causing an impaired three-dimensional feel. It is known that this problem can be solved if the line width of each of the linear image elements provided by lenticular lenses is expanded by an appropriate amount. To this end, various approaches have been proposed and they include: (1) the lenticular light-sensitive material is moved relative to exposing light carrying a two-dimensional image (See Japanese Patent Publication Kokoku No. 607/1974, U.S. Pat. Nos. 3,953,869 and 4,120,562, etc.); (2) the lenticular light-sensitive material is tilted through a predetermined angle (or reciprocated) relative to the exposing light (See Japanese Patent Publication Kokoku No. 33847/1978, etc ); and (3) the lenticular light-sensitive material is exposed to light as an additional element for expanding the line width is exactly superposed on said material, with said additional element being detached for viewing (See Japanese Patent Publication Kokoku No. 25902/1974, etc.)

The first and second methods need a means for moving the lenticular light-sensitive material or the projecting lens (or enlarging lens) and, hence, they have the problem that the overall equipment becomes undesirably bulky.

Figure 9:
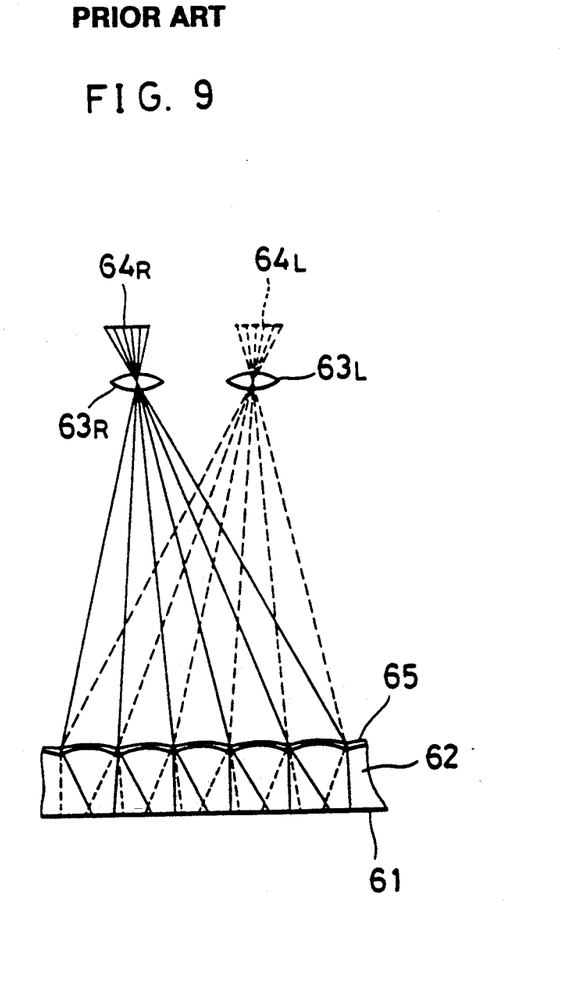
FIG. 9 is a diagram illustrating another prior art method of printing a stereoscopic photograph.

The third method which is typically described in Japanese Patent Publication Kokoku No 259025/1974 has the advantage that the line width of linear image elements can be simply expanded. However, this method has the following problem: as shown in FIG. 9, a lenticular sheet (light-sensitive material) 62 having a light-sensitive layer 61 provided on the back side is overlaid with a cover (additional element) 65 that consists of an arrangement of cylindrical lenses that have a curvature radius of $r_1$ on the side in contact with the lenticular lenses in the lenticular sheet 62 and a curvature radius of $2r_1$ on the other side, that have a center thickness of $r_1 - \frac{1}{2}\cdot\sqrt{(4r_1{}^2 - d^2)}$ and that are arranged on a pitch of $2d$, on the condition that the lenticular lenses have a curvature radius of $r_1$ and are arranged on a pitch of $2d$; to fabricate the system, the cover 65 must be exactly superposed on the lenticular sheet 62 in a darkroom prior to exposure. Even if the two members can be superposed in perfect registry, it is quite cumbersome to perform this registering operation for every replacement of the lenticular light-sensitive material to be exposed.

Stated more specifically, with the lenticular lenses being typically space on a very small pitch of about 0.1 mm, it is not easy to have the cover 65 superposed on the lenticular sheet (light-sensitive material) 62 in perfect registry by operations in a darkroom. If perfect registry is not achieved, moiré will occur. This problem is more pronounced in the multi-lens system since difficult adjustments are involved to satisfy closer tolerances for registry.

BRIEF SUMMARY OF THE INVENTION

The present invention has been accomplished under these circumstances and has as an object providing a method of projecting a stereoscopic image by exposure with an additional lenticular sheet being either placed on top of a lenticular recording material such as a lenticular light-sensitive material or inserted in the vicinity thereof, said additional lenticular sheet having a different pitch of lenticular lenses from the lenticular sheet of said lenticular recording material.

Another object of the present invention is to provide a method of projecting a stereoscopic image by exposure with an additional lenticular being either placed on top of a lenticular recording material such as a lenticular light-sensitive material or inserted in the vicinity thereof, said additional lenticular sheet having the same pitch of lenticular lenses as the lenticular sheet of said lenticular recording material and moved relative to said lenticular recording material in a direction generally perpendicular to the generatrix of said additional lenticular sheet.

These methods do not require any fine adjustments to be made in a darkroom or the like and yet they produce little or no moiré while a stereoscopic image is projected with great ease that enables stereoscopic vision over an enlarged area, namely, with the line of linear image elements being expanded.

Still another object of the present invention is to provide an apparatus that is capable of printing stereoscopic photographs of the nature just described above.

The first object of the present invention can be attained by a method of projecting a stereoscopic image when recording images from two or more different view-points on a lenticular recording material composed of a lenticular sheet and recording layer provided on the back side thereof, characterized in that projection for recording is performed with an additional lenticular sheet being either placed on top of said lenticular recording material or inserted in the vicinity of said lenticular recording material in such a way that the generatrices of the two lenticular sheets are parallel to each other, said additional lenticular sheet having a different pitch of lenticular lenses from the lenticular sheet of said lenticular recording material and having a curvature only in a direction perpendicular to its own generatrix.

Preferably, projection for recording is performed with said additional lenticular sheet being moved in a direction generally perpendicular to its own generatrix.

The second object of the present invention can be attained by a method of projecting a stereoscopic image when recording images from two or more different view-points on a lenticular recording material composed of a lenticular sheet and a recording layer provided on the back side thereof, characterized in that projection for recording is performed with an additional lenticular sheet being moved in a direction generally perpendicular to its own generatrix, said additional lenticular sheet being either placed on top of said lenticular recording material or inserted in the vicinity of said lenticular recording material in such a way that the generatrices of the two lenticular sheets are parallel to each other, said additional lenticular sheet having the same pitch of lenticular lenses as the lenticular sheet of said lenticular recording material and having a curvature only in a direction perpendicular to its own generatrix.

The third object of the present invention can be attained by an apparatus for printing a stereoscopic photograph, comprising: a light source; a means for holding a film having at least one of images from two or more different viewpoints; a projecting lens; a means for holding a lenticular light-sensitive material for printing said images that is composed of a lenticular sheet and a light-sensitive layer provided on the back side thereof; and an additional lenticular sheet that has a different pitch of lenticular lenses from said lenticular sheet of said lenticular light-sensitive material, that has a curvature only in a direction perpendicular to its own generatrix, and that is to be either placed on top of said lenticular light-sensitive material or inserted in the vicinity thereof in the optical path between said projecting lens and said lenticular light-sensitive material in such a way that the generatrices of the two lenticular sheets are parallel to each other.

Preferably, said apparatus further includes a means for moving said additional sheet in a direction generally perpendicular to its own generatrix.

The third object of the present invention can be attained by an apparatus for printing a stereoscopic photograph, comprising: a light source; a means for holding a film having at least one of images from two or more different viewpoints; a projecting lens; a means for holding a lenticular light-sensitive material for printing said images that is composed of a lenticular sheet and a light-sensitive layer provided on the back side thereof; and an additional lenticular sheet that has the same pitch of lenticular lenses as said lenticular sheet of said lenticular light-sensitive material, that has a curvature only in a direction perpendicular to its own generatrix, and that is to be either placed on top of said lenticular light-sensitive material or inserted in the vicinity thereof in the optical path between said projecting lens and said lenticular light-sensitive material in such a way that the generatrices of the two lenticular sheets are parallel to each other; and a means for moving said additional lenticular sheet in a direction generally perpendicular to its own generatrix.

BRIEF DESCRIPTION OF THE DRAWINGS

FIG. 2 is a set of diagrams illustrating how a linear image element to be printed on a lenticular light-sensitive material is enlarged by the additional lenticular sheet to be used in the present invention, in which FIG. 2(a) shows the geometric relationship between a lenticular lens in the lenticular sheet of the lenticular light-sensitive material and a lenticular lens in the additional lenticular sheet; FIG. 2(b) shows how light is refracted by the two lenticular lenses; and FIG. 2(c) shows in part the shape of the additional lenticular sheet;

DETAILED DESCRIPTION OF THE INVENTION

The present invention is described below in detail.

In accordance with the method of present invention for projecting a stereoscopic image and in the apparatus of the present invention for implementing this method to print a stereoscopic photograph, a lenticular recording material such as a lenticular light-sensitive material that has a light-sensitive layer provided on the back side of a lenticular sheet that has a curvature only in the transverse direction is combined with an additional lenticular sheet that has a different pitch of lenticular lenses than said lenticular sheet and which is either placed on top of said lenticular sheet or inserted in the vicinity thereof in such a way that the generatrices of the two lenticular sheets are parallel to each other, with the additional lenticular sheet being preferably moved relative to the lenticular sheet of the recording material in a direction generally perpendicular to the generatrix of said additional lenticular sheet.

Alternatively, an additional lenticular sheet having the same pitch of lenticular lenses as the lenticular sheet of the lenticular recording material is either placed on top of said lenticular sheet or inserted in the vicinity thereof in such a way that the generatrices of the two lenticular sheets are parallel to each other, and the additional lenticular sheet is moved relative to the lenticular sheet of the recording material in a direction generally perpendicular to the generatrix of said additional lenticular sheet.

In either case, images from two or more different view-points are projected onto the lenticular light-sensitive material, whereby linear image elements are projected through the individual lenticular lenses in the lenticular sheet to be projected or printed on the recording layer on the back side of said lenticular sheet to produce a stereoscopic photograph. The linear image elements formed as a stereoscopic image or photographic on the lenticular light-sensitive material have an adequately expanded line width and, hence, the area over which the viewer of the stereoscopic image or photograph can have stereoscopic vision is sufficiently enlarged to insure that the three-dimensional feel is not highly dependent on the eyepoint of the viewer.

If there is a difference in the pitch of lenticular lenses between the additional lenticular sheet and the lenticular sheet of the lenticular light-sensitive material, or if there is a misregistry between the two lenticular lenses (assuming that the two lenticular sheets have the same pitch), a moiré pattern or other defects can potentially develop. But in the case of different pitches, the problem just mentioned above can be mitigated by insuring that the ratio of the pitch of lenticular lenses in the additional lenticular sheet to that of lenticular lenses in the recording material such as a lenticular light-sensitive material takes on an integral value. Further, by effecting projection or exposure with the additional lenticular sheet being moved either in one way or reciprocating in a direction generally perpendicular to its own generatrix, the development of a moiré pattern and other defects can be suppressed irrespective of whether the pitches of the two lenticular sheets are different (in particular, the pitch for the additional lenticular sheet is greater than the pitch for the recording material such as a lenticular light-sensitive material) or the same.

Thus, in the method of the present invention for projecting a stereoscopic image or in the apparatus for printing a stereoscopic photograph, lenticular lenses in the additional lenticular sheet and lenticular lenses in the recording material such as a lenticular light-sensitive material need not be brought into registry with as close tolerances as required in the prior art when placing the additional lenticular sheet either on top of the recording material or in its vicinity. Therefore, one can project a stereoscopic image or print a stereoscopic photograph with great ease even if he is not a skilled operator.

On the pages that follow, the method of the present invention for projecting a stereoscopic image and the apparatus for printing a stereoscopic photograph are described in greater detail with reference to the preferred examples shown in accompanying drawings.

Figure 1:
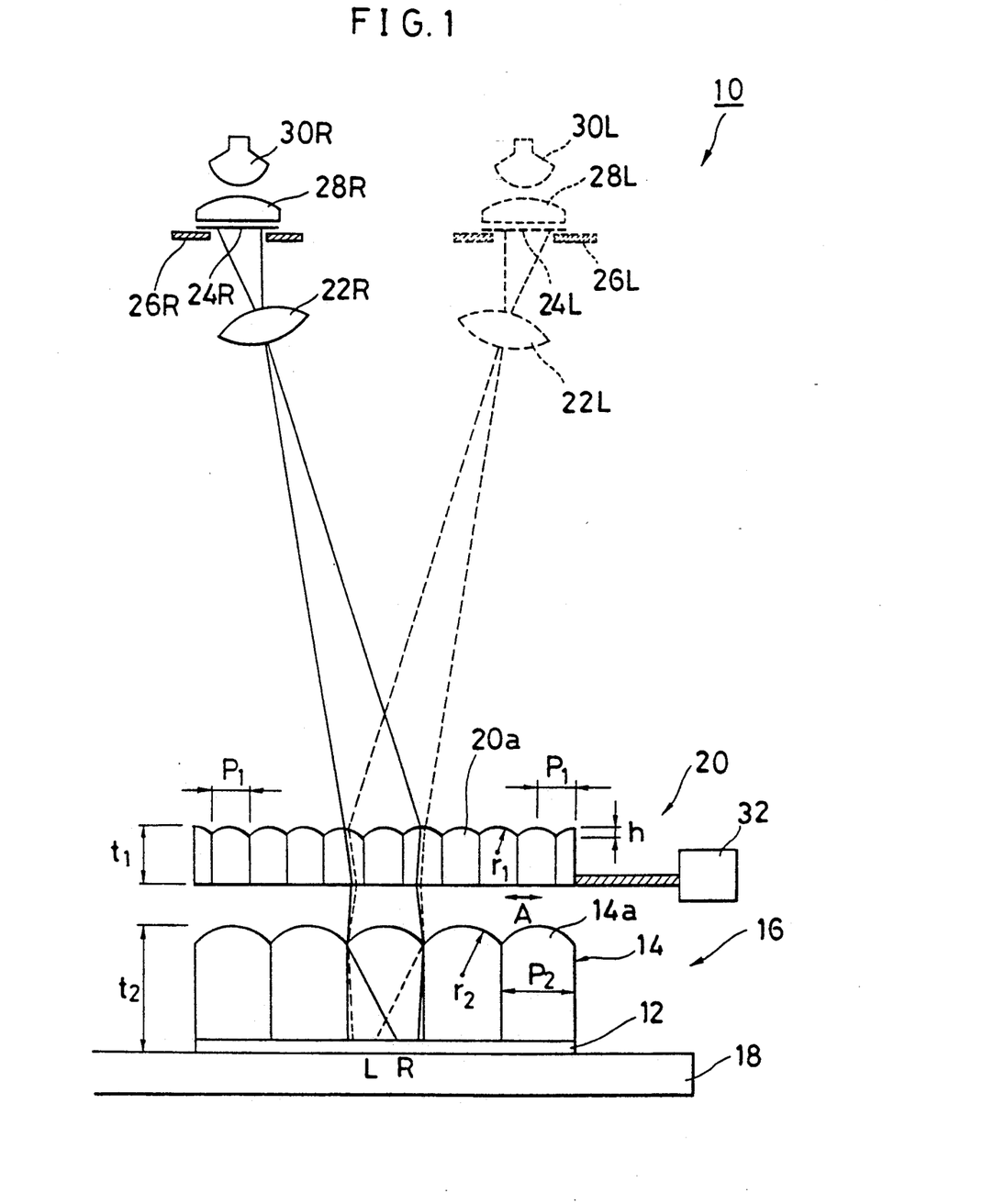
FIG. 1 is a diagrammatic cross-sectional view showing an example of an apparatus for printing a stereoscopic photograph implementing the method of the present invention for projecting a stereoscopic image.

FIG. 1 is a schematic diagram showing the composition of an apparatus for printing a stereoscopic photograph implementing the method of the present invention for projecting a stereoscopic image. The following description is directed to the two-lens system which is a typical case but it should be understood that this is not the sole case of the present invention and that is may be applicable to multilens systems such as three-lens or four-lens systems.

The apparatus for printing a stereoscopic photograph which is generally indicated by 10 in FIG. 1 comprises: a holding means 18 for holding a lenticular light-sensitive material 16 that is composed of a lenticular sheet 14 having a light-sensitive layer 12 provided on the back side; an additional lenticular sheet 20 that has a curvature only in the transverse direction and which is to be either placed on top of the lenticular light-sensitive material 16 held by that means 18 or inserted in the vicinity of said light-sensitive material 16; projecting lenses 22R and 22L; films 24R and 24L for having images from different view-points; holding means 26R and 26L for holding the films 24R and 24L, respectively; condenser lenses 28R and 28L; and light sources 30R and 30L. Preferably, the apparatus 10 is equipped with a means 32 for moving the additional lenticular sheet 20 in a direction generally perpendicular to its own generatrix.

The lenticular light-sensitive material 16 to be used in the present invention is composed of the lenticular sheet 14 that is an arrangement of multiple main lenticular lenses 14a having a curvature only in the transverse direction and which has the light-sensitive layer 12 provided on the flat surface on the back side for recording linear image elements as either latent or visible images. In the example shown, each of the main lenticular lenses 14a is kind of semi-cylindrical lens that forms a cylindrical surface with a curvature radius of $r_2$ on the obverse side (facing the light sources) whereas the reverse side forms a plane that is perpendicular to the central optical axis of the lens; the thickness of the lens is $t_2$ and its width is equal to the pitch $p_2$, with the lens having a predetermined length that extends in a direction perpendicular to the paper. The pitch $p_2$ of main lenticular lenses 14a in the lenticular sheet 14 is not limited to any particular value and may be selected as appropriate for the viewing distance; for direct viewing with the eyes, $p_2$ is preferably equivalent to 7-15 lines per millimeter, namely, 0.067-0.143 mm. This is because the least distance of distinct vision over which a human can see an object unstrained is approximately 25 cm for the normal eyes although it slightly differs from person to person and also because the resolving power of the normal human eye at the least distance of distinct vision is about 10 lines/mm if individual differences are neglected. If the pitch $p_2$ of main lenticular lenses 14a is less than 7 lines/mm (greater than 0.143 mm) or greater than 15 lines/mm (less than 0.067 mm), appropriate stereoscopic vision cannot be achieved since linear image elements will appear totally separate from each other or appear overlapping even if the individual differences in the least distance of distinct vision, the resolving power and the pupil-to-pupil distance are taken into consideration. If the viewing distance is greater than the least distance of distinct vision, one may proportionately increase the pitch $p_2$ of main lenticular lenses 14a. It should also be noted that since the surface of the light-sensitive layer 12 on the back side of each main lenticular lens 14a is the position where linear image elements are to be imaged, the thickness $t_2$ of the main lenticular lens 14a is approximately equal to its focal length $f_2$. The lenticular sheet 14 as a component of the lenticular light-sensitive material 16 to be used in the present invention is in no way limited to the embodiment shown in FIG. 1 and any other lenticular sheets that are known in the art may be employed.

The additional lenticular sheet 20 to be used in the present invention is the most characterizing part of the present invention; composed of a multiple of additional lenticular lenses 20a that have a curvature only in the transverse direction, the additional lenticular sheet 20 changes the refractive power of the main lenticular lenses 14a in the lenticular sheet 14 of the lenticular light-sensitive material 16 by the minimum necessary amount to expand the line width of linear image elements to be printed on the light-sensitive layer 12 of the lenticular light-sensitive material 16.

In the case shown in FIG. 1, each of the additional lenticular lenses 20a is a kind of semi-cylindrical lens that forms a cylindrical surface with a curvature radius of $r_1$ on the obverse side (facing the light sources) whereas the reverse side forms a plane that is perpendicular to the central optical axis of that cylindrical surface; the thickness of the lens is $t_1$ and its width is equal to the pitch $p_1$, with the lens having a predetermined length that extends in a direction perpendicular to the paper. However, the additional lenticular lens 20a that can be used in the present invention is in no way limited to the cylindrical lens shown in FIG. 1 and any other lens can be used as long as it satisfies the following conditions: that it be a convex lens, that it have a curvature only in the transverse direction and that it be capable of changing the refractive power of each main lenticular lens 14a by a slight degree. Further, the obverse side of the additional lenticular lens 20a need not form a cylindrical surface but it may form a convex curved surface such as an elliptical cylindrical surface; the reverse side also need not form a plane but it may form a convex or concave surface. It should also be noted that the additional lenticular lens 20a is in no way limited to a convex cylindrical lens but it may be a concave cylindrical lens.

The mechanism by which the line width of linear image elements can be expanded by the additional lenticular sheet 20 used in the present invention is described below with reference to FIGS. 2(a), 2(b) and 2(c). The following description is directed to a typical case in which each of the additional lenticular lenses 20a composing the additional lenticular sheet 20 is a thin convex lens, the additional lenticular lenses 20a are coaxial with the main lenticular lenses 14a, and the rays of light are paraxial. It should also be noted that each of FIGS. 2(a)-2(c) is a cross-sectional view and that the lenses shown there have a predetermined length that extends perpendicular to the paper.

Figure 2:
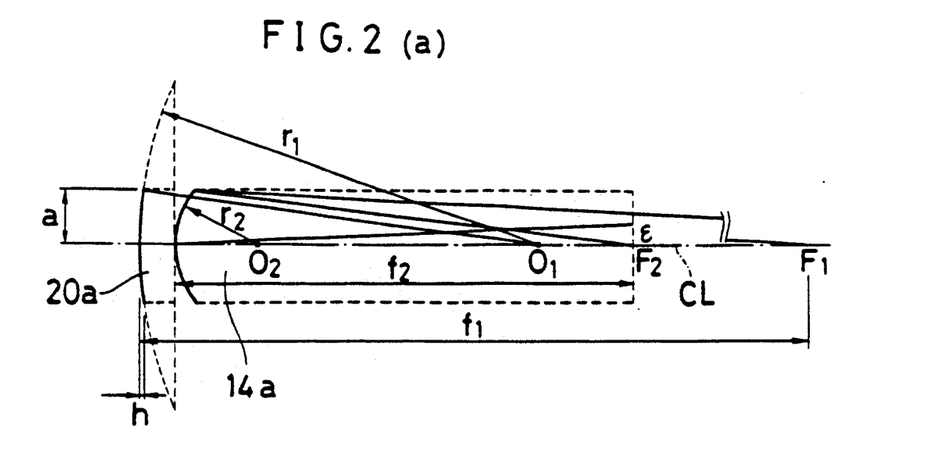

As shown in FIG. 2(a), the main lenticular lens 14a and the additional lenticular lens 20a have the same centerline CL. If it is assumed that the main lenticular lens 14a has the center of curvature and the focal point at $O_2$ and $F_2$, respectively, on the centerline CL, the radius of curvature and the focal length can be expressed by $r_2$ and $f_2$, respectively. On the other hand, if it is assumed that the additional lenticular lens 20a has the center of curvature and the focal point at $O_1$ and $F_1$, respectively, on the centerline CL, the radius of curvature and the focal length can be expressed by $r_1$ and $f_1$, respectively. When printing (exposure) is to be done on the lenticular light-sensitive material 16, the distance from the lenticular sheet 14 to the projecting lenses 22R and 22L is much larger than the apertures of the projecting lenses 22R and 22L, as well as the pitch $p_2$ of lenticular lenses 14a and, hence, the light incident on the lenticular lens 14a may well be regarded as consisting of substantially parallel rays.

Therefore, if parallel rays of light having a width of a are directly incident on the lenticular lens 14a in the lenticular light-sensitive material 16, they will be imaged as a linear image element at the position of focal point $F_2$. However, if the additional lenticular lens 20a is placed or inserted on the side upstream of the lenticular lens 14a (on the side facing the light sources), the parallel rays of light having the width a are refracted by the additional lenticular lens 20a so that the linear image element formed at the position of focal point $F_2$ will be enlarged to a width of $\epsilon$.

Now, referring to FIG. 2(b), a medium i' has a relative refractive index of $n_{ii'}$ with respect to a medium i, and light passing through the medium i is incident on the medium i' at an angle of $\theta_i$ and is refracted by an angle of $\theta_{i'}$. There parameters can be related by the following equation:

$$n_{ii'} = \sin \theta_i / \sin \theta_{i'}$$

If $\theta i$ and $\theta i'$ are small, the following relationship is valid:

$$n_{ii'} = d\theta_i / d\theta'$$

Hence, if the lenticular lenses 20a and 14a are assumed to have the same refractive index n, the present invention is based on the operating principle that "one-nth of $d\theta_{2'}$ which is the angle of offset from parallel rays that is caused by the lenticular lens 20a is equal to $d\theta_{3'}$ which is the angle of spread of rays passing through the lenticular lens 14a". As one can see from FIG. 2(a), the angle of offset, $d\theta_{2'}$, from parallel rays that is caused by the lenticular lens 20a and the angle of spread, $d\theta_{3'}$, passing through the lenticular lens 14a can be expressed by the focal lengths $f_1$ and $f_2$ of the respective lenses and the widths of rays a and $\epsilon$. The relationships between the parameters of interest can be expressed by the following equations:

$$d\theta_{3'} = d\theta_{2'}/n$$

$$d\theta_{2'} = a/f_1$$

$$d\theta_{3'} = \epsilon/f_2$$

hence, $$n\epsilon/f_2 = a/f_1$$

$$\epsilon = (a/n) \cdot (f_2/f_1) \ldots \quad (I)$$

Further, referring to FIG. 2(a), the focal point $F_1$ is in the air medium whereas the focal point $F_2$ is in the medium (say, a glass medium) that composes the lenticular lens 14a and each medium has the refractive index n; hence, the curvature radii, $r_1$ and $r_2$, of the lenticular lenses 20a and 14a, respectively, and their focal lengths $f_1$ and $f_2$, are related by the following equations:

$$f_1 = r_1/(n-1)$$

$$f_2 = nr_2/(n-1)$$

By substituting these equations into eq (I), we obtain:

$$\epsilon = r_2 a/r_1 \ldots \quad (II)$$

Referring now to FIG. 2(c), the pitch pl of additional lenticular lenses 20a, the radius of curvature $r_1$, and the level difference h (the difference in height between the peak on the central axis of the lenticular lens 20a and each end portion) can be related by the following equation, in which $(p_1/2)^2 > h^2$ $$r_1 = (p_1/2)^2/2h$$

By substituting this equation into eq. (II), we obtain:

$$\epsilon = 2ar_2h/(p_1/2)^2 \ldots \quad (III)$$

As one can see from eq. (III), $\epsilon$ or the width of necessary enlargement of a linear image element in one main lenticular lens 14a in the lenticular light-sensitive material 16 can be determined not only by the width a of light rays and radius of curvature $r_2$ which are related to the pitch $p_2$ of main lenticular lenses 14a, but also by the level difference h and the pitch $p_1$ of additional lenticular lenses 20a that compose the additional lenticular sheet 20.

Figure 3:
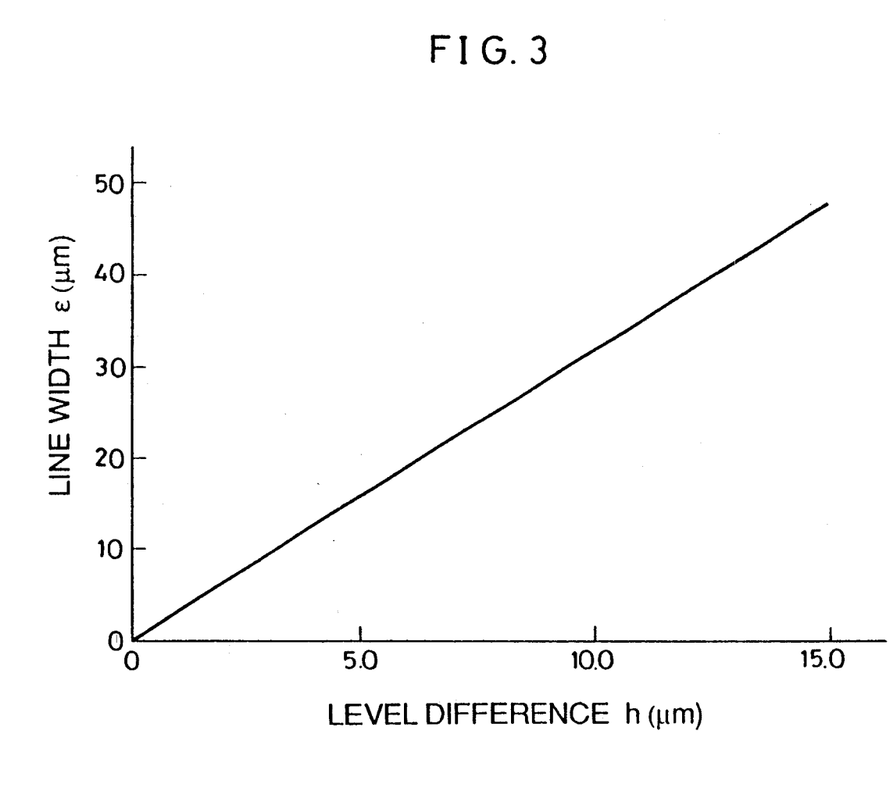
FIG. 3 is a graph showing how the line width ($\epsilon$) of a linear image element is enlarged as a function of the level difference h of the additional lenticular sheet to be used in the present invention.

Take, for example, the case where the width a of light rays is equal to one half the pitch $p_2$ of main lenticular lenses 14a which is 0.10 mm, with the radius of curvature $r_2$ being 0.08 mm. If the pitch $p_1$ of additional lenticular lenses 20a is taken at 0.10 mm, the above-defined width of necessary enlargement is expressed by the following equation and can be shown graphically as depicted in FIG. 3:

$$\epsilon = 3.2h$$

Thus, in the present invention, the additional lenticular sheet 20 which is an arrangement of multiple additional lenticular lenses 20a having an appropriate level difference h is inserted between both projection lenses and the lenticular light-sensitive material 16 and in the vicinity of the latter or, alternatively, said sheet 20 is placed directly on top of the lenticular light-sensitive material 16. By this simple procedure, the line widths of individual linear image elements to be printed on the lenticular light-sensitive material 16 can be increased by the necessary amount for expanding the range of positions over which the viewer can have stereoscopic vision. When the additional lenticular sheet 20 is to be inserted, optionally accompanied by movement, it can be placed between both projecting lenses 22R and 22L, and the lenticular light-sensitive material 16 in such a way that the lenticular sheet 14 of the light-sensitive material 16 is parallel to the additional lenticular sheet 20 and that the generatrices of the two sheets are also parallel to each other. Any other relative positions can be taken as long as the linear image elements to be recorded will not be so enlarged as to interfere with the light-sensitive layer 12 within the pitch $p_2$ of the main lenticular lenses 14a in the adjacent lenticular light-sensitive material 16. Preferably, the additional lenticular sheet 20 is placed either on top of the lenticular light-sensitive material 16 or in close vicinity thereto. The reason for this is as follows: from the viewpoint of increasing the line width of linear image elements, the distance between the additional lenticular sheet 20 and the lenticular light-sensitive material 16 should preferably be as large as possible but if it is excessive, the linear image elements will be enlarged to reach the light-sensitive layer 12 beneath the adjacent main lenticular lenses 14a and the resulting interference will produce only poor stereoscopic vision.

In the present invention, the pitch $p_1$ of lenticular lenses in the additional lenticular sheet 20 may be the same or different from the pitch $p_2$ of main lenticular lenses 14a in the lenticular sheet 14 of the lenticular light-sensitive material 16. If the two pitches are the same, at least one of the two lenticular sheets must be moved relative to the other in a direction generally perpendicular to their generatrices. If the two pitches are different or if the peaks in one lenticular sheet are not in perfect registry with the valleys in the other lenticular sheet having the same pitch, moiré may sometimes occur to deteriorate the image quality of the stereoscopic photograph to be produced. Therefore, if the pitch $p_1$ is different from the pitch $p_2$, the ratio between the two pitches preferably takes on an integral value. The ratio of $p_1/p_2$ is not limited to any particular value but it is preferably 1/100–100, with the range of 1/10–10 being more preferred. If $p_1/p_2$ is less than 1/100, the drop in sharpness that occurs on account of the diffraction of light due to the pitch $p_1$ becomes no longer negligible although the exact amount of drop depends on the size of pitch $p_2$. If $p_1/p_2$ exceeds 100, unevenness in the enlargement of linear images becomes noticeable.

The pitch $p_1$ of lenticular lenses 20a in the additional lenticular sheet 20 suffices to be within the above-specified range of integral ratios to the pitch $p_2$ of lenticular lenses 14a in the lenticular light-sensitive material. If one wants to view directly a reproduced visible image on the recorded lenticular light-sensitive material with the eyes, the pitch $p_1$ is preferably set to be at least 0.05 mm in association with the lenticular light-sensitive material 16 whose pitch $p_2$ is 7–15 lines/mm (0.067–0.143 mm) If the pitch $p_1$ is less than 0.05 mm, the diffraction of light causes blurring and the drop in sharpness becomes no longer negligible. In this case, too, the upper limit of the pitch $p_1$ is no way limiting, except that $p_1$ is preferably large from the viewpoint of ease in the preparation of the additional lenticular sheet 20. However, as will be discussed hereinafter, the amount of relative movement of the additional lenticular sheet 20 which is effected to suppress the development of moiré is preferably twice to three times the pitch of that sheet $(2p_1-3p_1)$ and, hence, $p_1$ is preferably small from the viewpoints of the amount of operation of the moving means 32 and the repetition frequency of moiré that develops when the additional lenticular sheet is inserted and positioned in a stationary state. Hence, in the case under consideration, the upper limit of the pitch $p_1$ is preferably adjusted to be 0.5 mm. Needless to say, if the pitch $p_2$ of lenticular lenses 14a in the lenticular sheet 14 of the lenticular light-sensitive material 16 is greater or smaller than in the case of direct viewing with the eyes, one may need to increase the pitch $p_1$ of lenticular lenses 20a in the additional lenticular sheet 20 proportionately.

The projecting lenses 22R and 22L to be used in the present invention serve to insure that the original images from different viewpoints that are carried by the films 24R and 24L are to be focused on the light-sensitive layer 12 of the lenticular light-sensitive material 16 and those lenses are not limited in any particular way but various known types can be used. Suitable projecting lenses may be selected as appropriate for the sizes of the original images and lenticular light-sensitive material 16 to be used. The preferred projecting lenses are those which are movable in accordance with the ratio by which the original images should be enlarged.

The film holding means 26R and 26L may be selected as appropriate for the shape of the films 24R and 24L having original images, which take on such forms as slides, sheets cut to a predetermined length and rolls of film. For example, the film holding means may be a sliding holder, a rotary holder, a reel, etc. Likewise, the means 18 for holding the lenticular light-sensitive material 16 may take on an appropriate form as appropriate for the shape of the lenticular light-sensitive material 16.

The light sources 30R and 30R and the condenser lenses 28R and 28L may be of any types that are capable of illuminating the films 24R and 24L with the necessary amount of light for allowing the original images on those films to be printed on the lenticular light-sensitive material 16 and suitable types may be selected from various known versions. If desired, the condenser lenses may be omitted. Any other members such as diaphragm stop that are necessary for printing stereoscopic photographs may be added.

In the embodiment shown in FIG. 1, the moving means 32 is attached to the additional lenticular sheet 20 so that it can be moved in the direction of arrow A, or in a direction generally perpendicular to the generatrices of additional lenticular lenses 20a. This adaptation is indispensable if the pitch of lenticular lenses 14a in the lenticular light-sensitive material 16 is the same as the pitch of lenticular lenses 20a in the additional lenticular sheet 20, whereas it is optional if the two pitches are different. This may be explained as follows with reference to the case where the additional lenticular sheet 20 is placed in position on top of the lenticular light-sensitive material 16. First suppose the case where the pitch of lenticular lenses 14a is the same as that of lenticular lenses 2Ca; if there is a misalignment between the two kinds of lenticular lenses 14a and 20a (i.e., the peak of lens 14a is not in perfect registry with the peak of lens 20a, or the valleys of the two lenses are not in perfect registry with each other), intensive moiré will develop to cause marked deterioration in the image observed by stereoscopic vision. In fact, however, it is difficult and time-consuming to achieve perfect registry between the lenticular light-sensitive material 16 and the additional lenticular sheet 20 that have the same pitch of lenticular lenses by operation in a darkroom, etc. and it is even more difficult to perform printing in a continuous manner. Moiré may sometimes develop, too, if the pitch of lenticular lenses 14a is different from the pitch of lenticular lenses 20a. In either case, the development of moiré can be suppressed by moving the additional lenticular sheet 20 relative to the lenticular light-sensitive material 16. The movement may be one-way or two-way (reciprocation, or alternation in movement). Preferably, the amount of this movement is not less than the pitch $p_1$ of additional lenticular lenses 20a; more preferably, it is equivalent to twice to three times the pitch $p_1$ ($2p_1$–$3p_1$) and this also applies to the case of reciprocating movement. In other words, the additional lenticular sheet is preferably moved by an amount that ranges from one to several times, more preferably from two to three times (even in the case of reciprocating movement), the pitch of additional lenticular lenses. By so doing, the line width of the linear image element to be printed on the light-sensitive layer 12 lying under a certain main lenticular lens 14a can be expanded without causing interference with the linear image element to be printed on the light-sensitive layer 12 lying under an adjacent main lenticular lens 14a. It should also be noted that the movement of the additional lenticular sheet must continue during at least one cycle of illumination (exposure), i.e., as long as the shutter opens, and it is also required that movement by the predetermined amount be completed within that period. Moving the additional lenticular sheet 20 in the manner described above offers the following advantages: the original images to be printed can be averaged as linear image elements; moiré that can potentially develop on account of offsets in position between the peaks (or valleys) of two kinds of lenticular lenses having the same pitch, offsets between the two pitches $p_1$ and $p_2$, or offsets in the degree of parallelness between the generatrices of the two kinds of lenticular lenses 14a and 20a, angular offsets, and other misalignments in registration of the two lenticular sheets can be eliminated or suppressed to prevent the deterioration of the reproduced linear image elements so that the image observed by stereoscopic vision is smooth without flickering.

Figure 6:
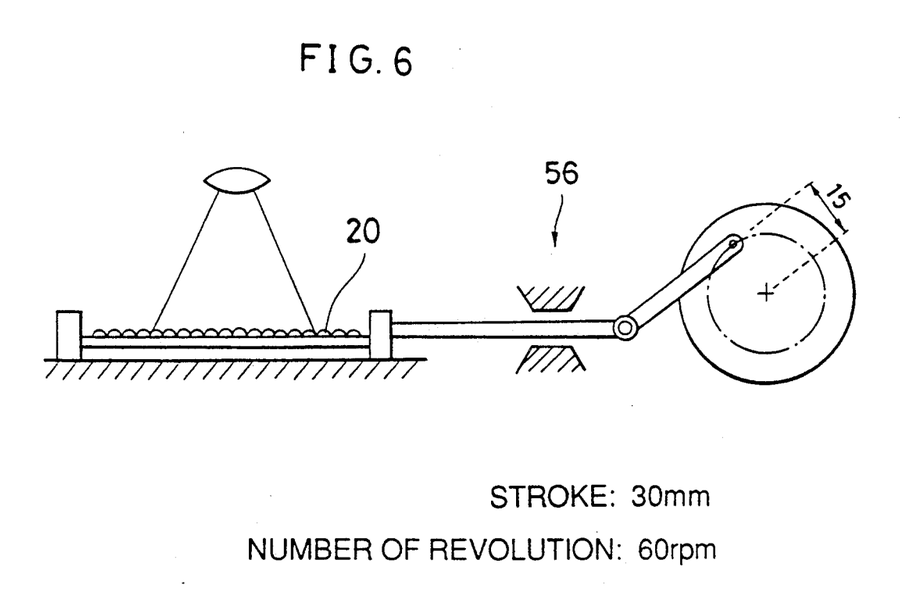
FIG. 6 is a schematic diagram of a device for reciprocating the additional lenticular sheet used in Experiment 2 conducted on the method of the present invention for projecting a stereoscopic image.

The moving means 32 to be used in the present invention is not limited to any particular type as long as it insures that the additional lenticular sheet 20 over the lenticular sheet 14 is kept moving by an amount of at least the pitch $p_1$ during exposure, and any known moving means may be employed. For example, the moving means 32 may be of a voltage-controlled type that is composed of an actuator (a displaceable element) such as a piezoelectric device, an electrostrictive device, a magnetostrictive device, a voice coil motor or an ultrasonic motor; or it may be a known vibrator (vibrating means) composed of a spring and an electoromagnet; or it may even be a mechanical reciprocating means as shown in FIG. 6. The additional lenticular sheet 20 may be moved in either one-way or two-way (reciprocating). The actuator may be attached to the additional lenticular sheet 20 either directly or indirectly via an intermediate member. One or more actuators may be attached as long as the necessary stroke can be attained. The velocity and frequency of the movement, whether one-way or two-way, are not limited to any particular values but may be selected as appropriate for the pitch $p_2$ of main lenticular lenses 14a and the pitch $p_1$ of additional lenticular lenses 20a.

It should be noted that the moving means 32 is not limited to one for moving the additional lenticular sheet 20 but that it may be one for moving the lenticular light-sensitive material 16.

FIG. 1 shows the two-lens system which uses two light sources and two projecting lenses. Alternatively, a single light source and a single projecting lens may be combined with an optical mirror unit to construct a system in which two original images can be printed on the lenticular light-sensitive material either simultaneously or separately.

The foregoing description relates the two-lens system as a typical example but, needless to say, this is not the sole case of the present invention and its concept is applicable to the three-lens system (and apparatus) shown in FIG. 4, as well as other multiple-lens systems (and apparatus).

Figures 4A, 4B:
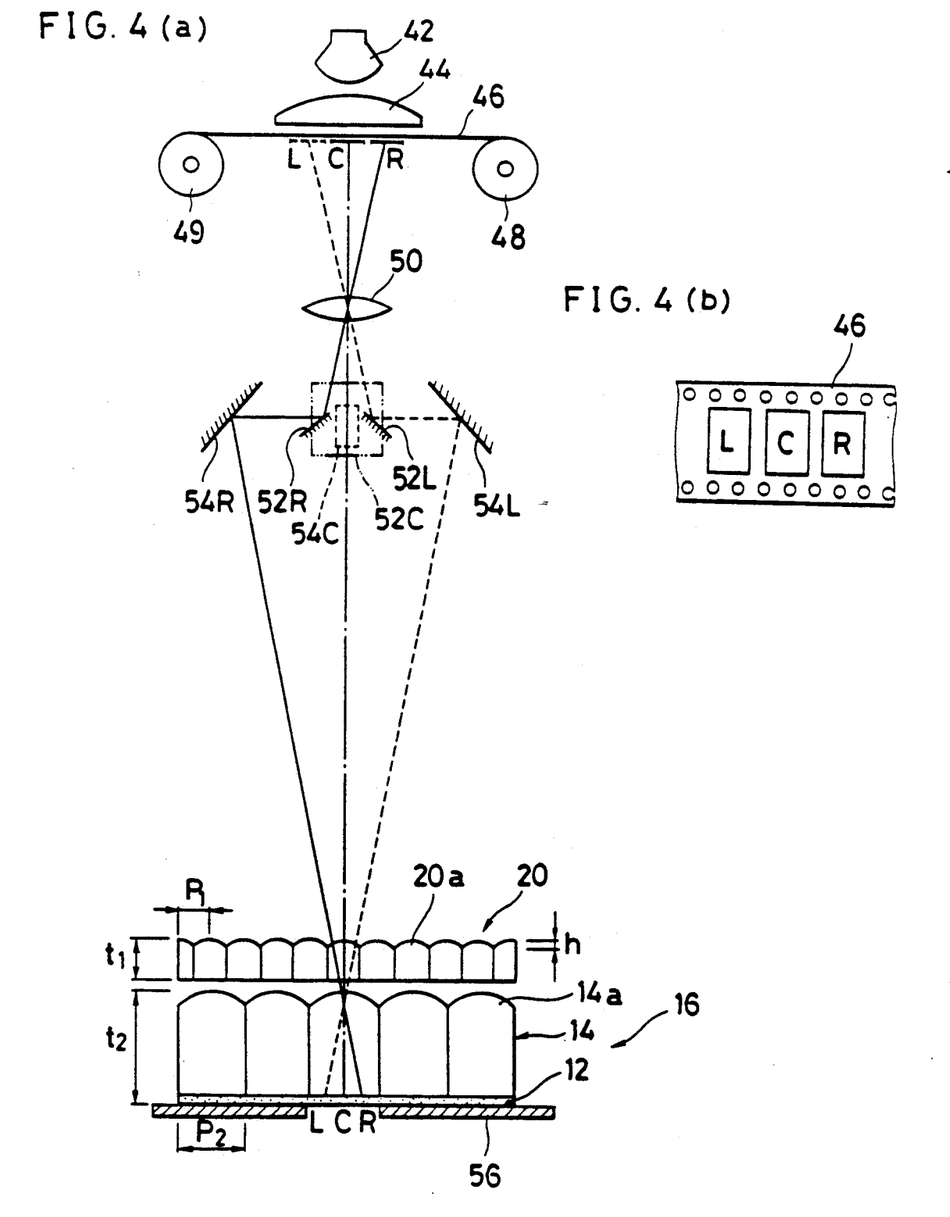
FIG. 4(a) is a diagrammatic cross-sectional view showing another example of an apparatus for printing a stereoscopic photograph implementing the method of the present invention for projecting a stereoscopic image.
FIG. 4(b) is a schematic diagram showing an example of the original film to be used in the present invention.

The apparatus for printing a stereoscopic photograph which is generally indicated by 40 in FIG. 4(a) comprises: a single light source 42; a single condenser lens 44; reels 48 and 49 onto which a film 46 is wound as it has original images R, C and L from different viewpoints as shown in FIG. 4(b); a single projecting lens 50; an optical mirror unit comprising mirrors 52R, 52C and 52L by means of which the light passing through the projecting lens 50 is split into components that selectively have the three original images R, C and L, and mirrors 54R, 54C and 54L that reflect the three split components of light so that they are incident on the lenticular light-sensitive material 16 at predetermined angles to focus three linear image elements at the right positions in the light-sensitive layer 12 beneath one lenticular lens 14a; an additional lenticular sheet 20 which is either placed on top of the lenticular light-sensitive material 16 (on the side facing the light source) or inserted in the vicinity of the latter; and a means 56 for holding the lenticular light-sensitive material 16.

In this three-lens system, the width by which linear image elements need be enlarged can be determined not only by the level difference h and pitch $p_1$ of additional lenticular lenses 20a in the additional lenticular sheet 20 to be either placed on top of the lenticular light-sensitive material 16 or inserted in its vicinity but also by the curvature radius $r_2$ and pitch $p_2$ of main lenticular lenses 14a in the lenticular light-sensitive material 16 and for details of the method for determining that width, see the discussion already made above. It should also be noted that as long as the additional lenticular sheet described above is employed, the numbers of light sources and projecting lenses or the number of original images are not limited in any particular way and may be selected as appropriate for the specific need.

In accordance with the present invention, the additional lenticular sheet which is an arrangement of multiple additional lenticular lenses having an appropriate pitch $p_1$ and level difference h is inserted between projecting lenses and the lenticular light-sensitive material and in the vicinity of said lenticular light-sensitive material which has an appropriate pitch ($p_2$) of main lenticular lenses that is different from $p_1$, or said additional lenticular sheet is placed directly on top of said light-sensitive material or, in particular, the additional lenticular sheet is moved relative to the light-sensitive material when the two pitches are the same. Whether in the two-lens system or in the three-lens or other multiple-lens systems, the present invention insures that the line width of linear image elements to be printed on the lenticular light-sensitive material can be easily increased by the necessary amount to reduce the strictness of limitations on the positions of two eyes for providing stereoscopic visions so that the recorded stereoscopic photographs or images can be readily observed without producing any noticeable flickering or unnaturalness depending on the viewing position.

The foregoing description concerns the particular case in which a stereoscopic photograph is printed on the lenticular light-sensitive material which has a lenticular sheet forming a unitary combination with the light-sensitive layer that will record linear image elements forming a stereoscopic image. However, this is not the sole case of the present invention and the light-sensitive layer may be physically separate from the lenticular sheet, or a stereoscopic photograph may be printed on a lenticular recording material having a recording layer. Here, examples of the light-sensitive material that has a light-sensitive layer and which is to be used in the present invention include a silver halide photograph material, an electrophotographic light-sensitive material (a photoreceptor), a thermal pressure-sensitive photosensitive material, a pressure-sensitive resin based photosensitive material, a heat-processable photosensitive material, a thermal photosensitive material, and any other known light-sensitive materials. In addition to these photographic materials, the recording media that compose the recording layer of the lenticular recording material may be electronic photoreceptors such as CCD, image element storage media such as optical recording media, magnetic recording media and magnetooptical recording media, or even image element display media such as a diffusing plate, a screen, a Fresnel lens, a reflecting mirror and a dual lenticular screen.

As described above in detail, according to the method of the present invention for projecting a stereoscopic image, an additional lenticular sheet which is an arrangement of multiple additional lenticular lenses having an appropriate level difference h and a different pitch than a recording material such as lenticular light-sensitive material, namely, a pitch that is at an appropriate ratio to the pitch of lenticular lenses in the recording material is inserted between projecting lenses and the recording material and in the vicinity of the latter or said additional lenticular sheet is placed directly on top of the recording material, with it being preferably moved in one way or reciprocated in a direction generally perpendicular to its own generatrix; alternatively, an additional lenticular sheet having the same pitch of lenticular lenses as the recording material is positioned in the same manner as described above and moved either in one way or reciprocally relative to the recording material in a direction generally perpendicular to its own generatrix. This method facilitates registration of the additional lenticular sheet relative to the recording material to such an extent that even if precise and strict registration is not achieved, the line width of linear image elements to be printed on the recording material can be easily expanded by the necessary amount without causing moiré, whereby the range of angles at which viewing is permissible is expanded markedly and the strictness of limitations on the positions of two eyes for providing stereoscopic vision is reduced so that the projected stereoscopic image and the recorded stereoscopic photograph can be readily observed without producing any moiré that can cause noticeable flickering or unnaturalness depending on the viewing position.

Thus, the present invention eliminates the cumbersome, difficult and precise work that is conventionally done in a darkroom to achieve registration of the additional lenticular sheet relative to the recording material and yet the resulting stereoscopic image or photograph is free from moiré and any deterioration in density, color density and tone; in other words, the stereoscopic image or photograph produced by the method of the present invention has high quality in the absence of any image deterioration and provides better three-dimensional feel.

The apparatus of the present invention for printing a stereoscopic photograph implementing the above-described method of course retains the advantages of that method; further, the apparatus is simple in construction and involves no need to have the additional lenticular sheet placed in intimate contact with the lenticular light-sensitive material by precise registration; hence, the need to achieve strict registration between the two members is eliminated and the light-sensitive material can be moved or replaced so easily that the printing operation can be performed continuously in an efficient and economical way, thereby yielding inexpensive stereoscopic photographs.

EXPERIMENTS

The present invention ins described below more specifically with reference to exemplary experiments.

Experiment 1

Figure 5:
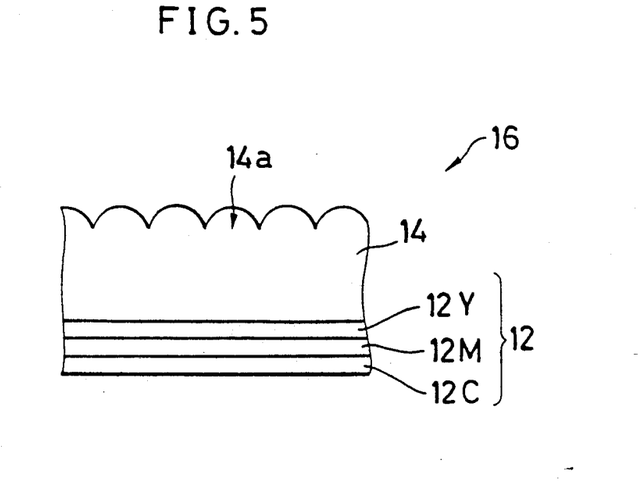
FIG. 5 is a schematic cross-sectional view of the lenticular light-sensitive material used in the experiments conducted on the method of the present invention for projecting a stereoscopic image.

A light-sensitive layer for color paper 12 (see FIG. 5) was coated onto a main lenticular sheet 14 that was made of polyvinyl chloride (PVC) and which comprised a row of main lenticular lenses 14a that were spaced on a pitch ($p_2$) of 0.12 mm and that had a curvature radius ($r_2$) of 0.10 mm and a thickness ($t_2 = f_2$) of 0.30 mm. The light-sensitive layer 12 had a blue-sensitive yellow color forming layer 12Y, a green-sensitive magenta color forming layer 12M and a red-sensitive cyan color forming layer 12C superposed in the order written.

Samples of PVC additional lenticular sheet with different pitches of lenticular lenses (see the first column of Table 1) were provided. For adjusting the lens action of the individual samples, an acetone solution of a styrene/methyl methacrylate copolymer was applied to those samples and dried. As as result, additional lenticular sheets having various level differences h (see the second column of Table 1) were prepared. The measurement of h was conducted with Surfcorder Model SE-3F of Kosaka Laboratory Co, Ltd.

The samples of additional lenticular sheet 20 were placed on top of the samples of lenticular light-sensitive material 16 each consisting of the main lenticular sheet 14 and the light-sensitive layer 12, and two original images were printed by means of an apparatus for printing stereoscopic photographs that was of the type shown in FIG. 1. The widths of elements in each of the stereoscopic photographs produced and the amounts of resulting angular expansion were measured and the data are shown in FIG. 1. The width of elements in each of the stereoscopic photographs produced and the amounts of resulting angular expansion were measured and the date are shown in the 3rd to 5th columns or Table 1 for the element width and in the 6th to 8th columns for the angular expansion. The former was measured with a Comparator Model SR-2 of Shimazu Corporation and the latter was measured with a Goniophotometer Model GP-IR of Murakami Color Research Laboratory. Further, flickering and the degree of moiré development were checked visually and the results are also shown in Table 1.

TABLE 1-1

| Pitch $P_1$, μm | Level difference h, μm | Element width, μm | | | Angular enlargement, deg. | | | Visual check | |
|---|---|---|---|---|---|---|---|---|---|
| | | initial | gain | total | initial | gain | total | flickering | moiré |
| none | — | 27 | — | 27 | 7.7 | — | 7.7 | X | O |
| 80 | 1.0 | 27 | 6 | 33 | 7.7 | 1.7 | 9.4 | Δ | Δ |
| | 1.8 | 27 | 14 | 41 | 7.7 | 4.0 | 11.7 | O | Δ |
| | 2.5 | 27 | 18 | 45 | 7.7 | 5.1 | 12.8 | O | Δ |
| 100 | 2.1 | 27 | 8 | 35 | 7.7 | 2.3 | 10.0 | O | O |
| | 2.6 | 27 | 11 | 38 | 7.7 | 3.1 | 10.8 | O | O |
| | 3.8 | 27 | 19 | 46 | 7.7 | 5.4 | 13.1 | O | O |
| 120 | 2.4 | 27 | 7 | 34 | 7.7 | 2.0 | 9.7 | Δ | O |
| | 3.7 | 27 | 13 | 40 | 7.7 | 3.7 | 11.4 | O | O |
| | 5.2 | 27 | 17 | 44 | 7.7 | 4.9 | 12.6 | O | O |

Criteria for visual check: O, none; Δ, negligible; X, extensive

TABLE 1-2

| Pitch $P_1$, μm | Level difference h, μm | Element width, μm | | | Angular enlargement, deg. | | | Visual check | |
|---|---|---|---|---|---|---|---|---|---|
| | | initial | gain | total | initial | gain | total | flickering | moiré |
| 200 | 6.5 | 27 | 6 | 33 | 7.7 | 1.7 | 9.4 | Δ | Δ |
| | 10.3 | 27 | 11 | 38 | 7.7 | 3.1 | 10.8 | O | Δ |
| | 14.4 | 27 | 18 | 55 | 7.7 | 5.1 | 12.8 | O | Δ |
| 300 | 12.9 | 27 | 5 | 32 | 7.7 | 1.4 | 9.1 | Δ | Δ |
| | 28.3 | 27 | 16 | 43 | 7.7 | 4.6 | 12.3 | O | Δ |
| | 38.5 | 27 | 21 | 48 | 7.7 | 6.0 | 13.7 | O | Δ |

Criteria for visual check: O, none; Δ, negligible; X, extensive

TABLE 2-1

| Pitch $P_1$, μm | Level difference h, μm | Element width, μm | | | Angular enlargement, deg. | | | Visual check | |
|---|---|---|---|---|---|---|---|---|---|
| | | initial | gain | total | initial | gain | total | flickering | moiré |
| none | — | 27 | — | | 7.7 | — | | X | O |
| 80 | 1.0 | 27 | 7 | 34 | 7.7 | 2.0 | 9.7 | Δ | O |
| | 1.8 | 27 | 14 | 41 | 7.7 | 4.0 | 11.7 | O | O |
| | 2.5 | 27 | 19 | 46 | 7.7 | 5.2 | 12.9 | O | O |
| 100 | 2.1 | 27 | 10 | 37 | 7.7 | 2.9 | 10.6 | O | O |
| | 2.6 | 27 | 13 | 40 | 7.7 | 3.7 | 11.4 | O | O |
| | 3.8 | 27 | 22 | 49 | 7.7 | 6.3 | 14.0 | O | O |
| 120 | 2.4 | 27 | 9 | 36 | 7.7 | 2.6 | 10.3 | O | O |
| | 3.7 | 27 | 15 | 42 | 7.7 | 4.3 | 12.0 | O | O |
| | 5.2 | 27 | 20 | 47 | 7.7 | 5.7 | 13.4 | O | O |

Criteria for visual check: O, none; Δ, negligible; X, extensive

TABLE 2-2

| Pitch $P_1$, μm | Level difference h, μm | Element width, μm | | | Angular enlargement, μm | | | Visual check | |
|---|---|---|---|---|---|---|---|---|---|
| | | initial | gain | total | initial | gain | total | flickering | moiré |
| 200 | 6.5 | 27 | 8 | 35 | 7.7 | 2.3 | 10.0 | O | O |
| | 10.3 | 27 | 14 | 41 | 7.7 | 4.0 | 11.7 | O | O |
| | 14.4 | 27 | 21 | 48 | 7.7 | 6.0 | 13.7 | O | O |
| 300 | 12.9 | 27 | 6 | 33 | 7.7 | 1.7 | 9.4 | Δ | O |
| | 28.3 | 27 | 19 | 46 | 7.7 | 5.4 | 13.1 | O | O |
| | 38.5 | 27 | 25 | 52 | 7.7 | 7.1 | 14.8 | O | O |

Criteria for visual check: O, none; Δ, negligible; X, extensive

As is clear from Tables 1 and 2, the present invention offers the advantage that the range of angles that permit viewing can be expanded markedly and satisfactory three-dimensional feel can be attained to facilitate the production of a stereoscopic photograph that involves less flickering and moiré development and which is easy to view and this advantage is obtained by either placing the additional lenticular sheet on top of the lenticular light-sensitive material or inserting it in the vicinity of the latter, or by reciprocating said additional lenticular sheet in a direction generally perpendicular to its own generatrix. Table 2 also shows that by reciprocating the additional lenticular sheet, not only does it become possible to increase the width of linear image elements and the amount of angular enlargement for permitting stereoscopic vision but also the occurrence of flickering and moiré can be eliminated over a broad range of pitches for lenticular lenses in the additional lenticular sheet.

What is claimed is:

1. A method of projecting a stereoscopic image when recording images from two or more different viewpoints on a lenticular recording material composed of a lenticular sheet and a recording layer provided on the back side thereof, said method including the steps of providing an additional lenticular sheet; and performing projection for recording with said additional lenticular sheet being either placed on top of said lenticular recording material or inserted in the vicinity of said lenticular recording material in such a way that the generatrices of the two lenticular sheets are parallel to each other, said additional lenticular sheet having a different pitch of lenticular lenses from the lenticular sheet of said lenticular recording material and having a curvature only in a direction perpendicular to its own generatrix.

2. A method according to claim 1, further including moving said additional lenticular sheet in a direction generally perpendicular to its own generatrix.

3. A method of projecting a stereoscopic image when recording images from two or more different viewpoints on a lenticular recording material composed of a lenticular sheet and a recording layer provided on the back side thereof, said method including the steps of providing an additional lenticular sheet; and performing projection for recording with said additional lenticular sheet being moved in a direction generally perpendicular to its own generatrix, said additional lenticular sheet being either placed on top of said lenticular recording material or inserted in the vicinity of said lenticular recording material in such a way that the generatrices of the two lenticular sheets are parallel to each other, said additional lenticular sheet having the same pitch of lenticular lenses as the lenticular sheet of said lenticular recording material and having a curvature only in a direction perpendicular to its own generatrix.

4. An apparatus for printing a stereoscopic photograph, comprising: a light source; a means for holding a film having at least one of images from two or more different viewpoints; a projecting lens; a means for holding a lenticular light-sensitive material for printing said images that is composed of a lenticular sheet and a light-sensitive layer provided on the back side thereof; and an additional lenticular sheet that has a different pitch of lenticular lenses from said lenticular sheet of said lenticular light-sensitive material, that has a curvature only in a direction perpendicular to its own generatrix, and that is to be either placed on top of said lenticular light-sensitive material or inserted in the vicinity thereof in the optical path between said projecting lens and said lenticular light-sensitive material in such a way that the generatrices of the two lenticular sheets are parallel to each other.

5. An apparatus according to claim 4 which further includes a means for moving said additional sheet in a direction generally perpendicular to its own generatrix.

6. An apparatus for printing a stereoscopic photograph, comprising: a light source; a means for holding a film having at least one of images from two or more different viewpoints; a projecting lens; a means for holding a lenticular light-sensitive material for printing said images that is composed of a lenticular sheet and a light-sensitive layer provided on the back side thereof; and an additional lenticular sheet that has the same pitch of lenticular lenses as said lenticular sheet of said lenticular light-sensitive material, that has a curvature only in a direction perpendicular to its own generatrix, and that is to be either placed on top of said lenticular light-sensitive material or inserted in the vicinity thereof in the optical path between said projecting lens and said lenticular light-sensitive material in such a way that the generatrices of the two lenticular sheets are parallel to each other; and a means for moving said additional lenticular sheet in a direction generally perpendicular to its own generatrix.

* * * * *